(No Model.)
L. J. ANGER.
MACHINE FOR FILLING CREAM PUFFS.
No. 504,857. Patented Sept. 12, 1893.
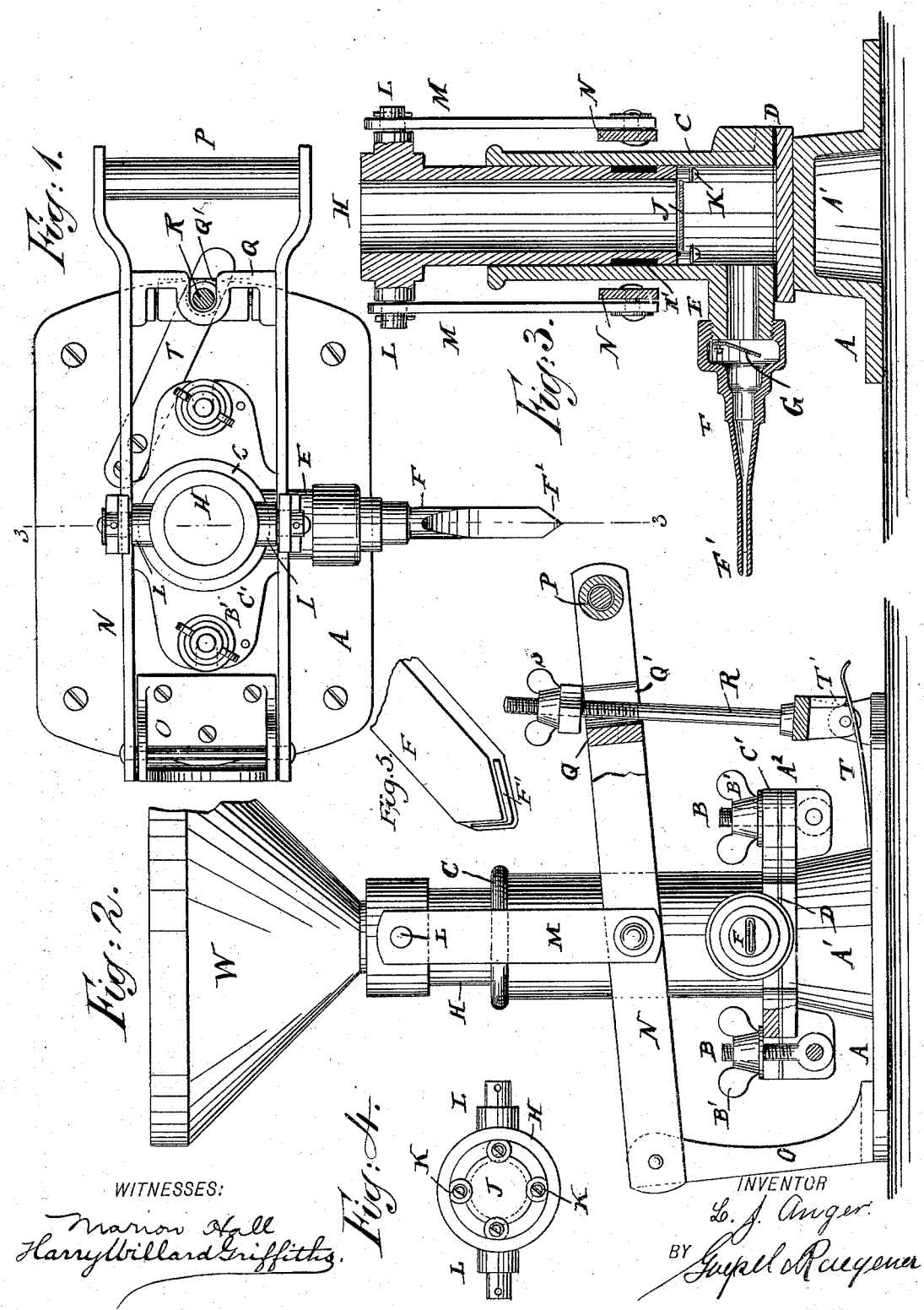
WITNESSES:
Marion Hall
Harry Willard Griffiths
INVENTOR
L. J. Anger.
BY
ATTORNEYS.

UNITED STATES PATENT OFFICE.

LOUIS J. ANGER, OF NEW YORK, N. Y.

MACHINE FOR FILLING CREAM-PUFFS.

SPECIFICATION forming part of Letters Patent No. 504,857, dated September 12, 1893.

Application filed December 27, 1892. Serial No. 456,395. (No model.)

*To all whom it may concern:*

Be it known that I, LOUIS J. ANGER, a citizen of the United States, residing in the city of New York, in the county and State of New York, have invented certain new and useful Improvements in Machines for Filling Cream-Puffs, of which the following is a specification.

Heretofore the cakes known as cream puffs were cut in two and the cream filled by means of a spoon or ladle into one half and the other half placed upon the cream, which held the two halves together. Later on a machine was provided having a pointed nozzle that was inserted into the cake, made of a single piece, and the cream ejected into this hollow cake or puff.

The object of my invention is to provide a new and improved machine of simple construction by means of which the said cakes or puffs can be filled easily and rapidly with the proper quantity of cream.

The invention consists in the combination with a cylinder, of a tubular plunger in the same, a valve at the lower end of said plunger, a funnel on the upper end of the plunger, a nozzle on the lower end of the cylinder and means for operating the plunger.

The invention also consists in the construction and combination of parts and details, which will be fully described hereinafter and finally pointed out in the claims.

In the accompanying drawings, Figure 1 is a plan-view of my improved machine for filling cream puffs, parts being in section. Fig. 2 is a side-view of the same, parts being broken out and others in section. Fig. 3 is a vertical transverse sectional view, on the line 3 3, of Fig. 1, and Fig. 4 is a plan-view of the under side of the cylindrical plunger. Fig. 5 is a detail perspective view of the end of the nozzle.

Similar letters of reference indicate corresponding parts.

The base A is provided with the upwardly-projecting boss A' having the laterally-projecting slotted wings A², to bottom projections of which the screws B are pivoted, on which the thumb-nuts B' are mounted.

The cylinder C is provided at its bottom with the laterally-projecting slotted wings C' of the same size as the wings A² on the boss A', and a layer D of packing material is interposed between the top of the boss A' and the bottom of the cylinder C. The pivoted screws B are swung up into the slots of the wings C' on the lower end of the cylinder, and the thumb-nuts B' are drawn up so as to securely hold the cylinder on the boss.

The cylinder C is provided at its lower end with the laterally-projecting neck E having its outer end screw-threaded, and on said neck the internally screw-threaded end of a flattened nozzle F is screwed, which is pointed or beveled at its free end, as shown at F', so as to permit inserting it into the hollow cake or puff. A flap-valve G is pivoted to the outer end of the neck E, at the top of the same.

The tubular plunger H fitting in the cylinder C is provided near its lower end with the packing H', and below the lower end of said plunger a disk or valve J is held that rests on the heads of four screws or projections K on the lower end of the plunger. At its upper end the plunger is provided with the two opposite trunnions L, which are connected by connecting-rods M with two levers N pivoted on standards O of the base-plate A. The swinging ends of said levers are connected by a handle-piece P and a short distance from said handle they are connected by a cross-piece Q bent to form a notch Q' for receiving a pivoted upwardly-projecting check-rod R, the upper end of which is screw-threaded and provided with a thumb-nut S. A flat spring T is secured to the base and bears against an offset T' on the lower end of the check-rod R to press the said check-rod into the notch Q'. A funnel W for the cream is inserted in the upper end of the tubular plunger H.

The operation is as follows:—The funnel W is filled with cream and a cream puff or hollow cake is applied on the end of the nozzle F. By means of the handle P the plunger H is raised, whereby a vacuum is created below the same and the cream passes from the plunger into the bottom part of the cylinder, the valve J being in lowered position, so as to permit the cream to pass. By the raising of the cylinder the flap-valve G is thrown up against the end of the neck E and closes the same. The plunger H is now forced downward, whereby the valve J is pressed up against its seat so as to close the lower end of the plunger, to prevent the cream in the bottom part of the cylinder from passing upward into the plunger; the flap-valve G is opened, and the cream is forced from the lower part of the cylinder through the nozzle F into the hollow cake or puff. As the nozzle is flattened and is beveled at its end it has two inclined openings at the end, whereby the cream is thrown outward so as to fill the entire puff uniformly. This is a matter of great importance, as it is always desirable to have the puff uniformly filled with cream. The filled puff is removed from the end of the nozzle and another empty one applied, the plunger is again raised and then depressed, and so on. As the flap-valve G closes the neck E every time the plunger is raised, it prevents the plunger from drawing the cream from the puff back into the nozzle again. After the desired number of puffs have been filled the funnel W is removed, the connecting-rods M are disengaged from the trunnions L, the nozzle F is unscrewed, the thumb-nuts B' are loosened and the screws B swung down, whereupon the cylinder, plunger, nozzle and funnel can easily be removed and thoroughly washed and cleaned, so as to prevent the souring of any remaining traces of the cream. The stroke of the plunger can easily be regulated according to the desired quantity of cream to be ejected into the puff by adjusting the thumb-nut S higher or lower.

Having thus described my invention, I claim as new and desire to secure by Letters Patent—

1. The combination with a cylinder, of a tubular plunger in the same, a valve on the lower end of the plunger, a neck projecting from the bottom of the cylinder, a valve on the outer end of said neck and a nozzle on said neck, substantially as set forth.

2. The combination with a cylinder, of a tubular plunger in the same, a valve on the lower end of the plunger, a funnel mounted on the upper end of the plunger, a nozzle on the lower end of said cylinder and an outwardly-opening valve at the inner end of said nozzle, substantially as set forth.

3. The combination with a cylinder, of a tubular plunger in the same, a valve on the lower end of said plunger, pivoted levers, rods connecting the plunger with said levers, an upwardly-projecting check-rod, a thumb-nut on said check-rod, a nozzle projecting from the lower end of the cylinder and an outwardly-opening valve at the inner end of said nozzle, substantially as set forth.

4. The combination with a cylinder, of a neck at the lower end of the same, an outwardly-opening valve pivoted on the end of said neck, a nozzle screwed on said neck, a tubular plunger in said cylinder, pivoted levers, rods connecting the plunger with the pivoted levers, a cross-piece connecting the levers and having a notch, a pivoted screw-rod projecting upward between the levers, a spring acting on the lower end of the same and pressing it into the notch of the cross-piece, a thumb-nut on said rod and a valve on the lower end of the plunger, substantially as set forth.

5. The combination with a base, of pivoted screws, a cylinder having slotted wings into which said pivoted screws can pass, thumb-nuts on said screws, a tubular plunger in the cylinder, a valve on the bottom of said plunger, a nozzle on the lower end of the cylinder, an outwardly-opening valve at the inner end of said nozzle and means for operating the plunger, substantially as set forth.

6. In a machine for filling cream-puffs, the combination with a cylinder and plunger, of a flattened nozzle having its free end beveled at both sides to form inclined side-openings at the end of the said nozzle, substantially as set forth.

In testimony that I claim the foregoing as my invention I have signed my name in presence of two subscribing witnesses.

LOUIS J. ANGER.

Witnesses:
OSCAR F. GUNZ,
HARRY WILLARD GRIFFITHS.